US011841041B1

(12) United States Patent
Wilcox et al.

(10) Patent No.: US 11,841,041 B1
(45) Date of Patent: Dec. 12, 2023

(54) FASTENING COLLARS, MULTI-PIECE FASTENING SYSTEMS, AND METHODS OF FASTENING

(71) Applicant: HOWMET AEROSPACE INC., Pittsburgh, PA (US)

(72) Inventors: Robert B. Wilcox, McGregor, TX (US); Justin Branch, Waco, TX (US); Ryan J. White, Farmington Hills, MI (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 333 days.

(21) Appl. No.: 16/826,941

(22) Filed: Mar. 23, 2020

Related U.S. Application Data

(63) Continuation of application No. 16/585,547, filed on Sep. 27, 2019, now abandoned.

(51) Int. Cl.
*F16B 19/10* (2006.01)

(52) U.S. Cl.
CPC .................. *F16B 19/1063* (2013.01)

(58) Field of Classification Search
CPC .............................. F16B 19/05; F16B 19/1063
USPC ........................................................ 411/361
See application file for complete search history.

(56) References Cited

U.S. PATENT DOCUMENTS

| | | | | | |
|---|---|---|---|---|---|
| 3,209,806 A | * | 10/1965 | Currier | ................ | F16B 41/002 29/520 |
| 3,209,807 A | * | 10/1965 | Ryner | .................. | F16B 41/002 29/520 |
| 3,271,058 A | * | 9/1966 | Anderson | ............... | F16B 19/05 411/383 |
| 3,542,106 A | * | 11/1970 | Busch, Jr. | ............... | F16B 39/30 411/929 |
| 4,781,501 A | * | 11/1988 | Jeal | ..................... | F16B 19/1054 411/69 |
| 5,037,259 A | * | 8/1991 | Duran | ..................... | F16B 39/28 411/173 |
| 5,399,052 A | * | 3/1995 | Volkmann | ........... | F16B 19/1063 411/930 |
| 5,947,667 A | * | 9/1999 | Cassatt | ............... | F16B 19/1063 411/39 |
| 7,955,035 B2 | * | 6/2011 | Singh | ..................... | F16B 19/05 411/361 |

(Continued)

*Primary Examiner* — Sarang Afzali
*Assistant Examiner* — Darrell C Ford
(74) *Attorney, Agent, or Firm* — K&L Gates LLP

(57) ABSTRACT

Fastening collars, multi-piece fastening systems, and methods of fastening are provided. The fastening collar comprises a first end, a second end, and an elongate portion intermediate the first end and the second end and defining a longitudinal axis of the fastening collar. The elongate portion comprises a first region adjacent the first end, a second region intermediate the first region and the second end, and a cavity. The first region comprises a first diameter and is configured to be received by a bore of a structure. The second region comprises a second diameter greater than the first diameter. The cavity extends through the elongate portion and is configured to receive at least a portion of a shank of the multi-piece fastening system. The elongate portion is configured to at least partially deform onto the shank responsive to forcible contact between the second region and an installation tool.

16 Claims, 13 Drawing Sheets

(56) References Cited

U.S. PATENT DOCUMENTS

| | | | |
|---|---|---|---|
| 2003/0215303 A1* | 11/2003 | Makino | F16B 19/05 |
| | | | 411/39 |
| 2005/0260056 A1* | 11/2005 | Denham | F16B 19/1054 |
| | | | 411/43 |
| 2007/0065251 A1* | 3/2007 | Otten | F16B 5/04 |
| | | | 411/361 |
| 2009/0016842 A1* | 1/2009 | Auriol | F16B 19/1063 |
| | | | 411/43 |
| 2014/0140786 A1* | 5/2014 | McKinlay | F16B 41/002 |
| | | | 411/147 |
| 2015/0267731 A1* | 9/2015 | Stewart | F16B 31/028 |
| | | | 411/10 |
| 2016/0068275 A1* | 3/2016 | Rizza | F16B 39/28 |
| | | | 411/132 |
| 2018/0274578 A1* | 9/2018 | Wang | F16B 21/20 |

* cited by examiner

FASTENING COLLARS, MULTI-PIECE FASTENING SYSTEMS, AND METHODS OF FASTENING

CROSS-REFERENCE TO RELATED APPLICATION

The present application is a continuation application claiming priority under 35 U.S.C. § 120 to co-pending U.S. patent application Ser. No. 16/585,547, filed Sep. 27, 2019, entitled "FASTENING COLLARS, MULTI-PIECE FASTENING SYSTEMS, AND METHODS OF FASTENING", the entire disclosure of which is hereby incorporated herein by reference.

FIELD OF USE

The present disclosure relates to fastening collars, multi-piece fastening systems, and methods of fastening.

BACKGROUND

Vehicle frames, storage racks, solar panel sub-structures, aircraft parts, and other structures can include numerous mechanical fasteners. For example, a structural fastener can be installed in a bore of a structural component to secure parts together. Properly installing a structural fastener into a bore presents challenges.

SUMMARY

According to one aspect of the present disclosure, a fastening collar for a multi-piece fastening system is provided. The fastening collar comprises a first end, a second end, and an elongate portion intermediate the first end and the second end and defining a longitudinal axis of the fastening collar. The elongate portion comprises a first region adjacent the first end, a second region intermediate the first region and the second end, and a cavity. The first region extends a first distance along the elongate portion and comprises a first diameter. The first region is configured to be received by a bore of a structure. The second region extends a second distance along the elongate portion and comprises a second diameter greater than the first diameter. The cavity extends through the elongate portion from the first end to the second end. The cavity is configured to receive at least a portion of a shank of the multi-piece fastening system, and the elongate portion is configured to at least partially deform onto the shank responsive to forcible contact between the second region and an installation tool.

According to another aspect of the present disclosure, a multi-piece fastening system is provided. The multi-piece fastening system comprises a fastening collar and a shank. The fastening collar comprises a first end, a second end, and an elongate portion intermediate the first end and the second end. The elongate portion defines a longitudinal axis of the fastening collar. The elongate portion comprises a first region adjacent the first end, a second region intermediate the first region and the second end, and a cavity. The first region extends a first distance along the elongate portion and comprises a first diameter. The first region is configured to be received by a bore of a structure. The second region extends a second distance along the elongate portion and comprises a second diameter greater than the first diameter. The cavity extends through the elongate portion from the first end to the second end. The shank is configured to be at least partially received by the cavity of the fastening collar. The elongate portion is configured to at least partially deform onto the shank responsive to forcible contact between the second region and an installation tool.

According to yet another aspect of the present disclosure, a method for fastening is provided. The method comprises inserting a first end of a fastening collar of a multi-piece fastening system into a bore in a structure. The multi-piece fastening system comprises a fastening collar and a shank. The fastening collar comprises a first end, a second end, and an elongate portion intermediate the first end and the second end. The elongate portion defines a longitudinal axis of the fastening collar. The elongate portion comprises a first region adjacent the first end, a second region intermediate the first region and the second end, and a cavity. The first region extends a first distance along the elongate portion and comprises a first diameter. The first region is configured to be received by a bore of a structure. The second region extends a second distance along the elongate portion and comprises a second diameter greater than the first diameter. The cavity extends through the elongate portion from the first end to the second end. The shank is configured to be at least partially received by the cavity of the fastening collar. The elongate portion is configured to at least partially deform onto the shank responsive to forcible contact between the second region and an installation tool. During and/or after the inserting, the method comprises forcibly contacting the second region with an anvil of the installation tool and deforming the fastening collar onto the shank, thereby securing at least a portion of the multi-piece fastening system in the structure.

It will be understood that the invention disclosed and described in this specification is not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples presented herein, and the manner of attaining them, will become more apparent, and the examples will be better understood, by reference to the following description taken in conjunction with the accompanying drawings, wherein.

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Figure 1A:
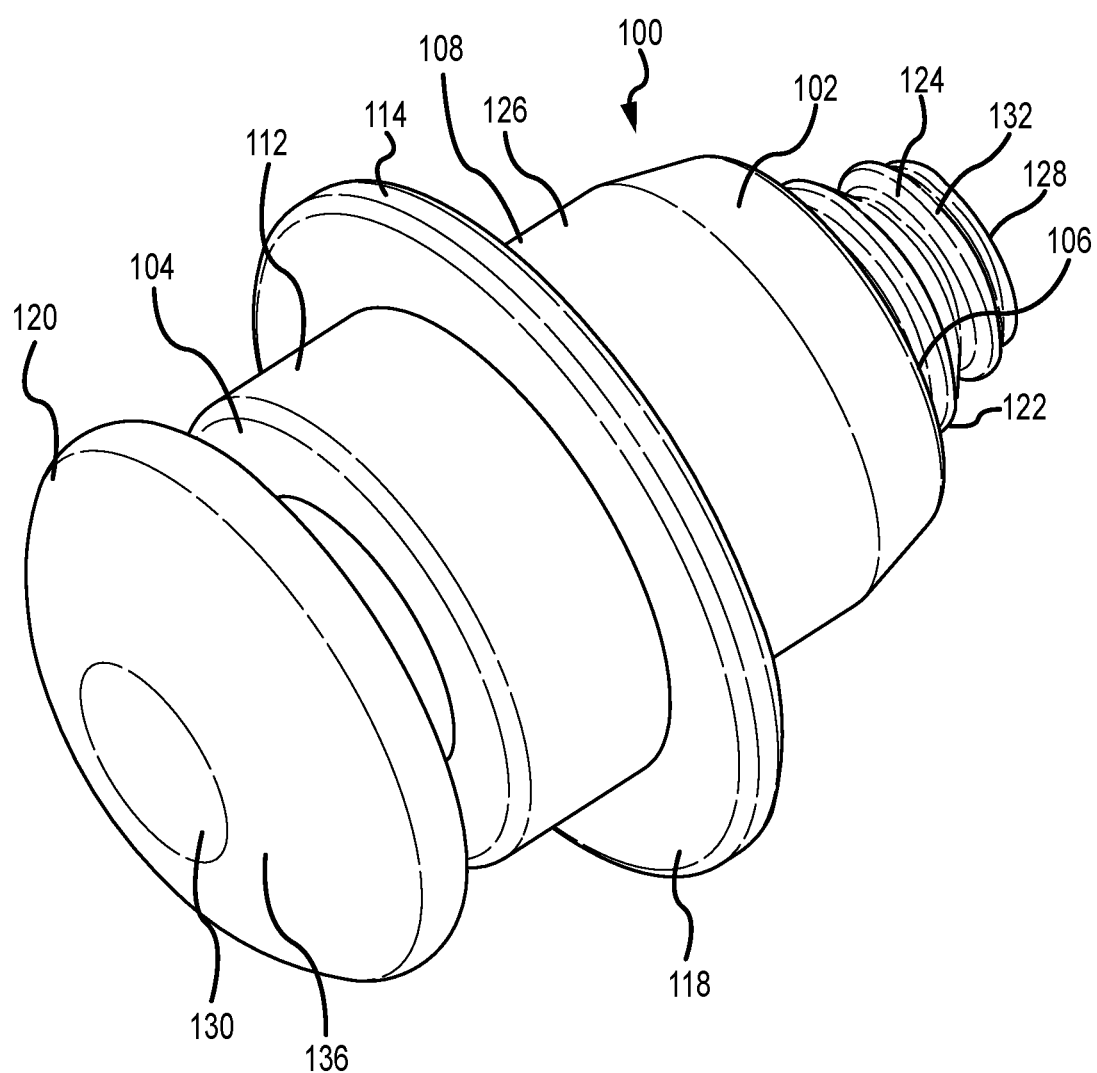
FIG. 1A is a perspective view of a non-limiting embodiment of a multi-piece fastening system according to the present disclosure.

Various examples are described and illustrated herein to provide an overall understanding of the structure, function, and use of the disclosed fastening collars, multi-piece fastening systems, and methods of fastening. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments," "some embodiments," "one embodiment," "an embodiment," or like phrases mean that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

Installing a threaded fastener into a multi-layer structure while enabling a first layer of the multi-layer structure to rotate about a longitudinal axis of the fastener can require the use of threads in a bore in the structure. Installation of the threaded fastener can require alignment of the threads on the threaded fastener and the threads in the threaded bore and concentric alignment of each bore of each layer in the multi-layer structure. An improper thread pattern or improper alignment of the threads can lead to an undesired installation of the threaded fastener (e.g., cross-threading). Moreover, a torque gauge may be needed to ensure the threaded fastener is properly inserted to the desired torque. Improper torque can result in damage to the threaded fastener and/or damage to the threaded bore and/or a less than desired securing force between the threaded fastener and structure. These additional steps can be time consuming, and if not properly followed, the threaded fastener may not be properly installed into the threaded bore, which can lead to failure of the structural joint. Thus, fastening collars, multi-piece fastening systems, and methods of fastening are provided herein that can increase the speed of installation of the fastening system, increase the reliability of a structural joint, and eliminate the need for a threaded bore in the structure. Additionally, the fastening collars, multi-piece fastening systems, and methods of fastening herein can enable a broader range of applications for structural fasteners, such as, for example, lockbolts and blind fasteners.

Figure 1B:
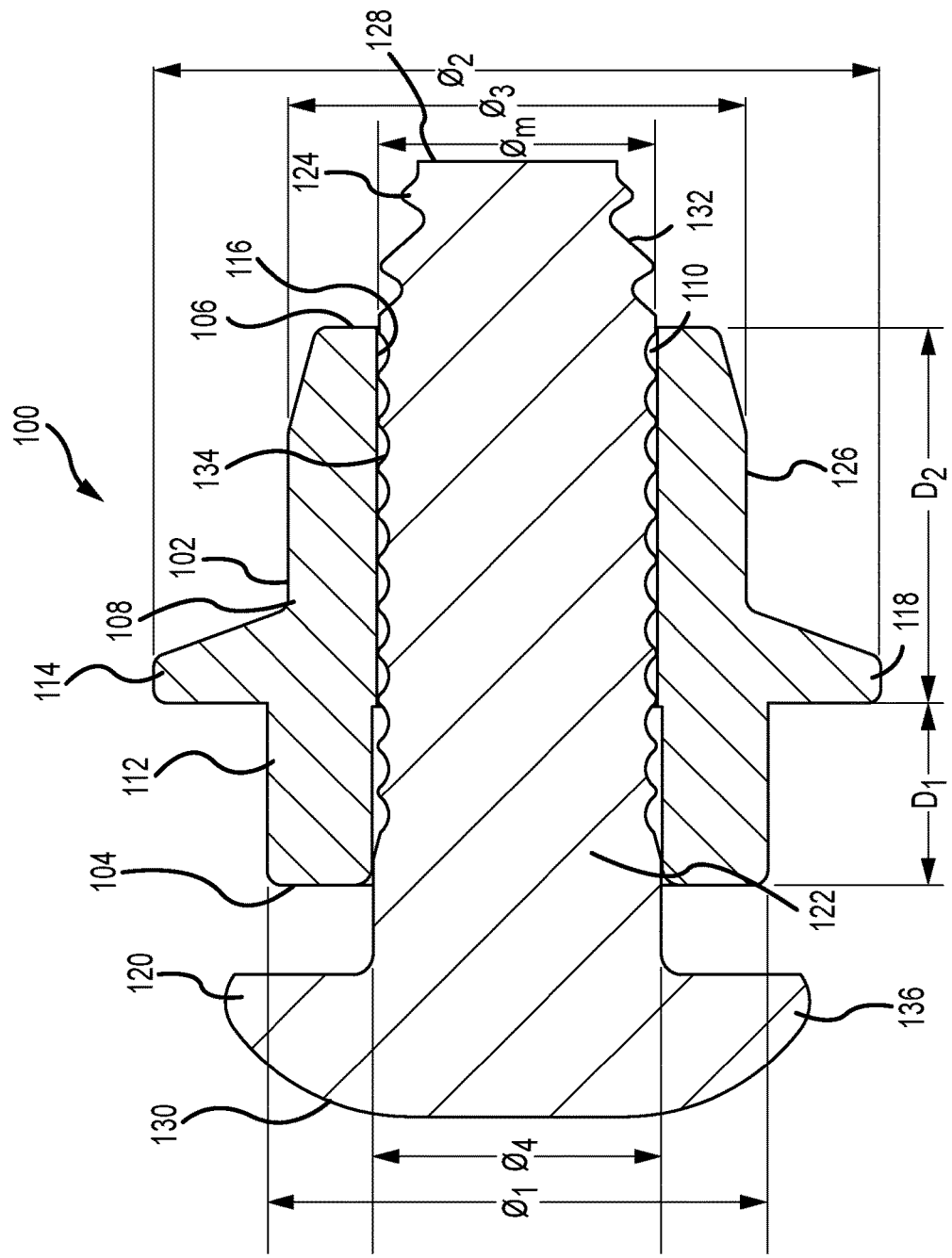
FIG. 1B is a cross-sectional side view of the multi-piece fastening system of FIG. 1A.

FIGS. 1A-1B illustrate a non-limiting embodiment of a multi-piece fastening system 100 according to the present disclosure. The multi-piece fastening system 100 can be adapted to be installed in a bore in a structure (e.g., as illustrated in FIGS. 6A-6D, discussed below). The multi-piece fastening system 100 can comprise at least two components, such as, for example, a fastening collar 102 and a mandrel 120 as illustrated in FIGS. 1A-1B, or in some embodiments, at least three components (not shown). In various non-limiting embodiments, the multi-piece fastening system 100 can comprise a two-piece assembly including the fastening collar 102 and the mandrel 120. In some embodiments, the multi-piece fastening system 100 can comprise at least one of a lockbolt and a blind fastener. For example, the lockbolt can be a structural lockbolt fastener, such as, for example, a structural rivet, a structural bolt, or a structural stud.

Figure 2:
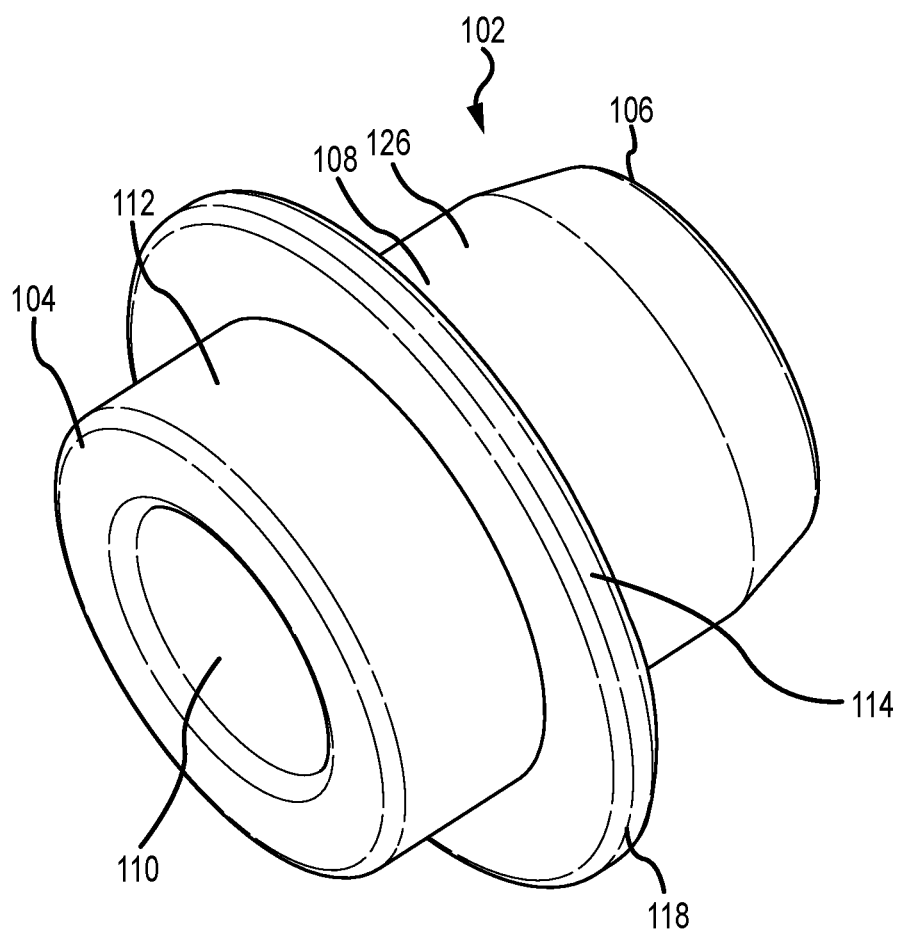
FIG. 2 is a perspective view of a non-limiting embodiment of a fastening collar of the multi-piece fastening system of FIG. 1A.

Referring to FIGS. 1A-1B and 2, the fastening collar 102 can comprise a first collar end 104, a second collar end 106, an elongate portion 108 disposed intermediate the first collar end 104 and the second collar end 106, and a cavity 110 extending through the elongate portion 108 from the first collar end 104 to the second collar end 106. The elongate portion 108 can define a longitudinal axis of the fastening collar 102 and/or the multi-piece fastening system 100. In various non-limiting embodiments, the elongate portion 108 can be a continuous, single piece that can facilitate quicker installation of the fastening collar 102. A surface 116 of the elongate portion 108 adjacent to the cavity 110 can comprise at least one of a substantially cylindrical region, a threaded region, an annular shoulder, and a groove, depending on the desired application.

The fastening collar 102 can comprise a first region 112 and a second region 114. The first region 112 can be adjacent the first collar end 104, extending a first distance, $d_1$, along the elongate portion 108, and comprising a first diameter, $\varnothing_1$. The first region 112 can be sized and configured to be received by a bore of a structure as described below. For example, the first distance, $d_1$, and the first diameter, $\varnothing_1$, can be sized and configured such that an adjacent layer of a structure can rotate about a longitudinal axis of the fastening collar 102. In various embodiments, the first distance, $d_1$, can be greater than the thickness of at least the adjacent layer of the structure such that the second region 114 applies minimal, if any, clamping force to the adjacent layer such that the adjacent layer can rotate about a longitudinal axis of the fastening collar 102. In certain embodiments, the first diameter, $\varnothing_1$, can be less than the diameter of a bore in the adjacent layer of the structure such that a clearance is present between the first region 112 and the adjacent layer such that the adjacent layer can rotate about a longitudinal axis of the fastening collar 102. The first region 112 can be sized and configured such that at least two adjacent layers can rotate about a longitudinal axis of the fastening collar 102, such as, for example, at least three adjacent layers.

The second region 114 can be intermediate the first region 112 and the second collar end 106, extending a second distance, $d_2$, along the elongate portion 108, and comprising a second diameter, $\varnothing_2$, greater than the first diameter, $\varnothing_1$. The second diameter, $\varnothing_2$, can be sized and configured in order to inhibit the fastening collar 102 from traversing through a bore in a structure beyond a predetermined distance. The second distance, $d_2$, can be sized and configured such that the fastening collar 102 can engage an installation tool and a desired clamping force between the fastening collar 102 and the mandrel 120 is achieved after installation of the multi-piece fastening system 100 into a structure.

In various embodiments, the second region 114 can be adjacent to the first region 112. For example, the second region 114 can comprise a flange 118 adjacent the first region 112. The flange 118 can comprise a flange diameter equal to or greater than the second diameter, $\varnothing_2$. For example, the flange diameter can be the second diameter, $\varnothing_2$, and the second region 114 can comprise a section 126 with a third diameter, $\varnothing_3$, that can be the same as the second diameter, $\varnothing_2$, or different than the second diameter, $\varnothing_2$. For example, the third diameter, $\varnothing_3$, can be less than the second diameter, $\varnothing_2$, the same as the second diameter, $\varnothing_2$, or greater than the second diameter, $\varnothing_2$. As illustrated in FIGS. 1A-1B and 2, the third diameter, $\varnothing_3$, of the section 126 can be configured in order to engage and/or be received by an anvil of an installation tool while the flange diameter of the flange 118 can inhibit the fastening collar 102 from traversing through a bore in a structure beyond a predetermined distance.

Figure 3:
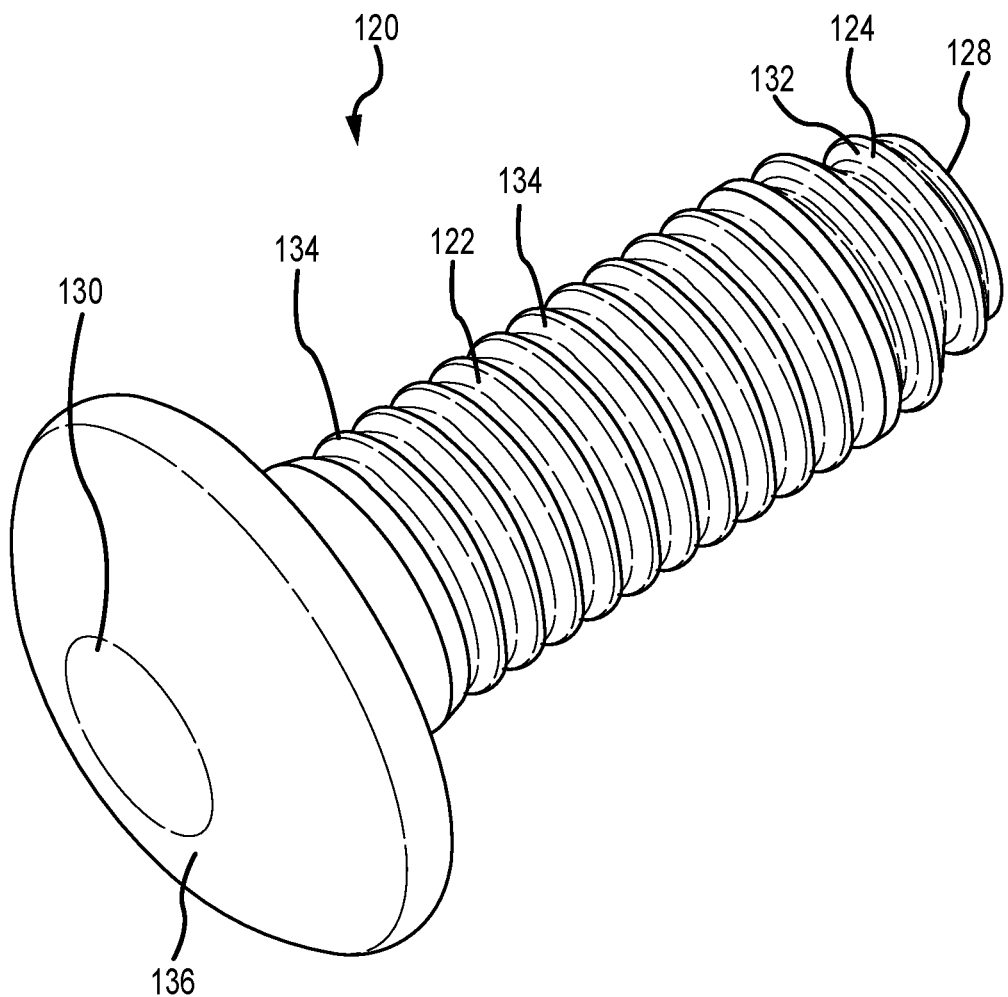
FIG. 3 is a perspective view of a non-limiting embodiment of a mandrel of the multi-piece fastening system of FIG. 1A.

Referring to FIGS. 1A-1B and 3, the mandrel 120 can comprise a first mandrel end 128, a second mandrel end 130, and a shank 122. The shank 122 can comprise a shape suitable to be received by the cavity 110 of the fastening collar 102, such as, for example, a generally cylindrical shape. The shank 122 can extend intermediate the first mandrel end 128 and the second mandrel end 130 and can be dimensioned so as to be disposed at least partially through the cavity 110. When the shank 122 is inserted in the cavity 110, the first mandrel end 128 can be disposed adjacent to the second collar end 106, and the second mandrel end 130 can be disposed adjacent to the first collar end 104. In various embodiments, the mandrel 120 can comprise a head portion 136 configured to inhibit the mandrel 120 from traversing through a bore in a structure beyond a predetermined distance. In various other embodiments, the mandrel 120 may not comprise a head portion (not shown).

Figure 6A:
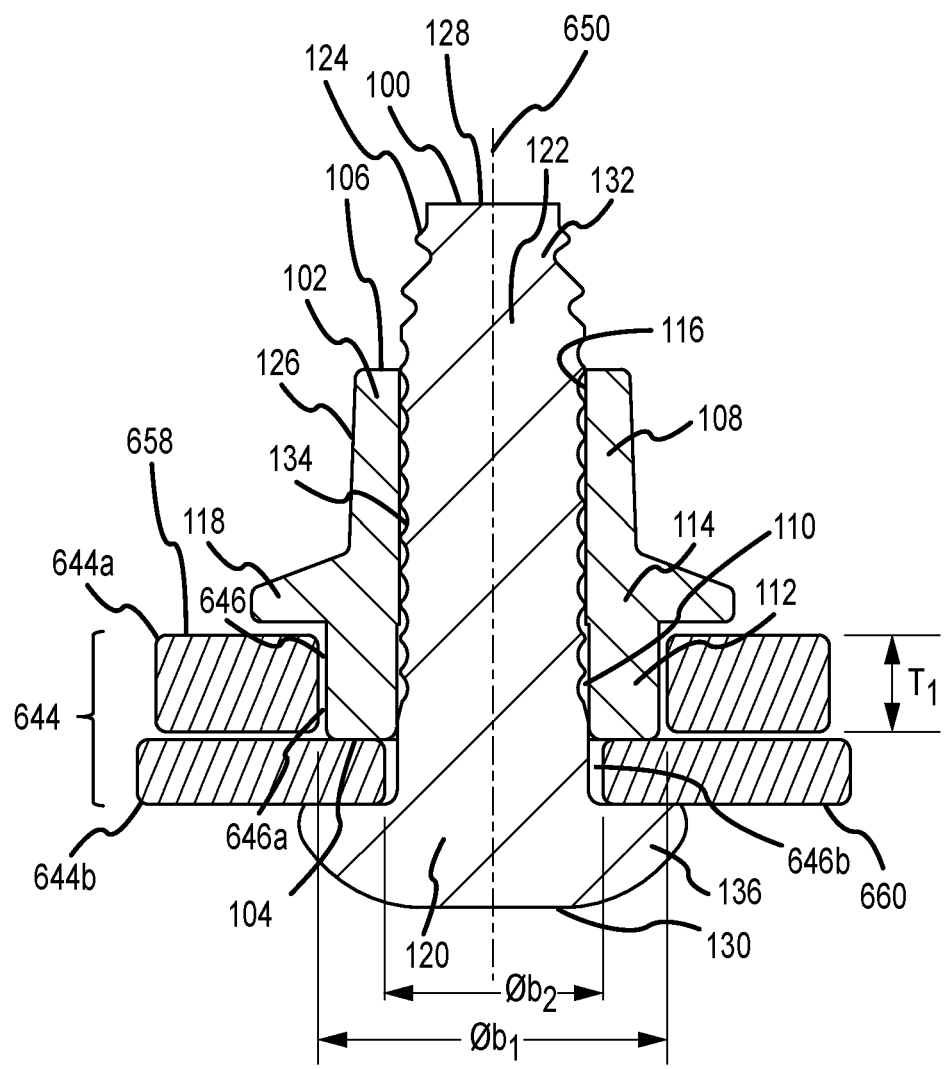
FIG. 6A is a cross-sectional side view of a non-limiting embodiment of a multi-piece fastening system and a structure according to the present disclosure.
Figure 6B:
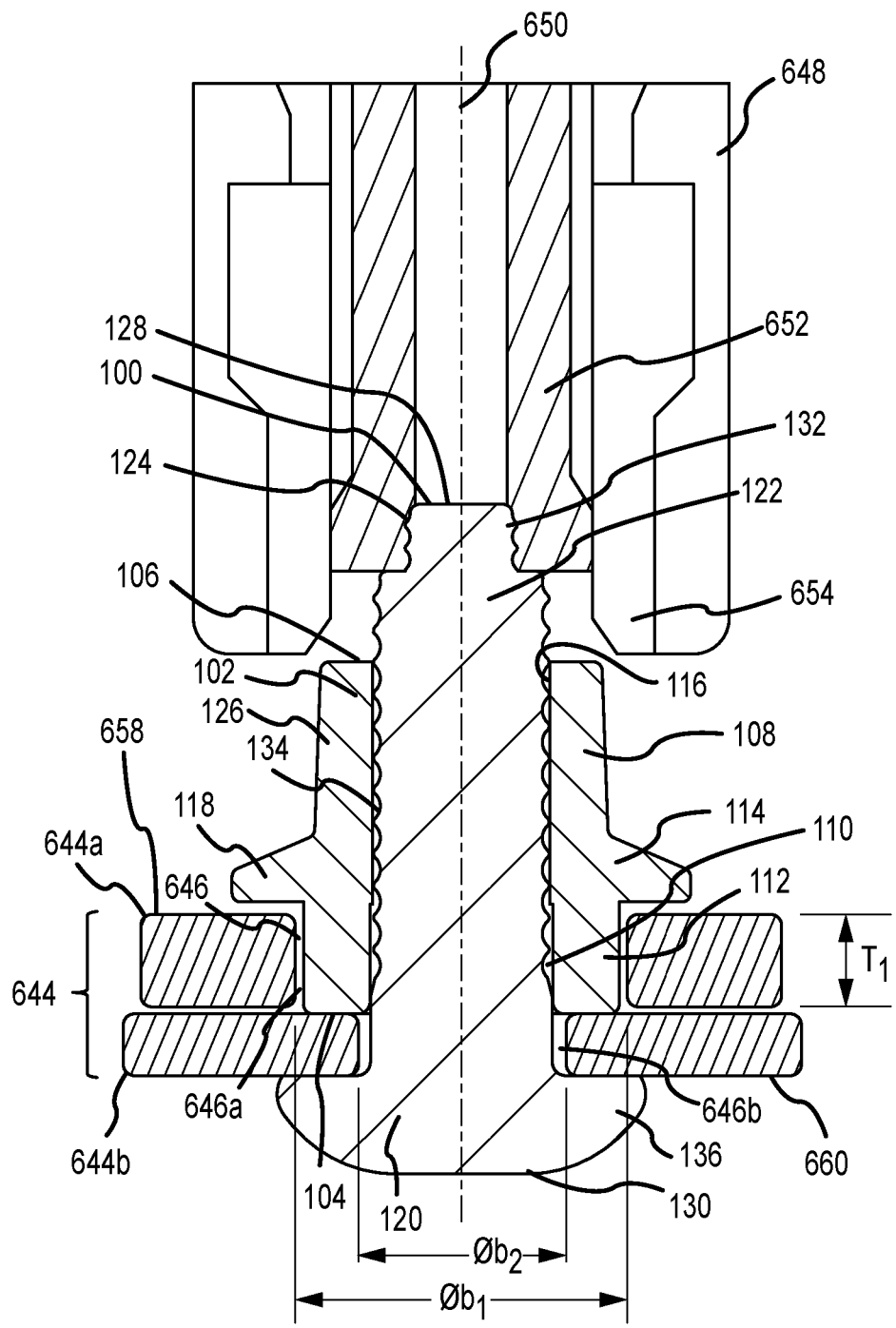
FIG. 6B is a cross-sectional side view of the multi-piece fastening system of FIG. 6A engaged with an installation tool.
Figure 6C:
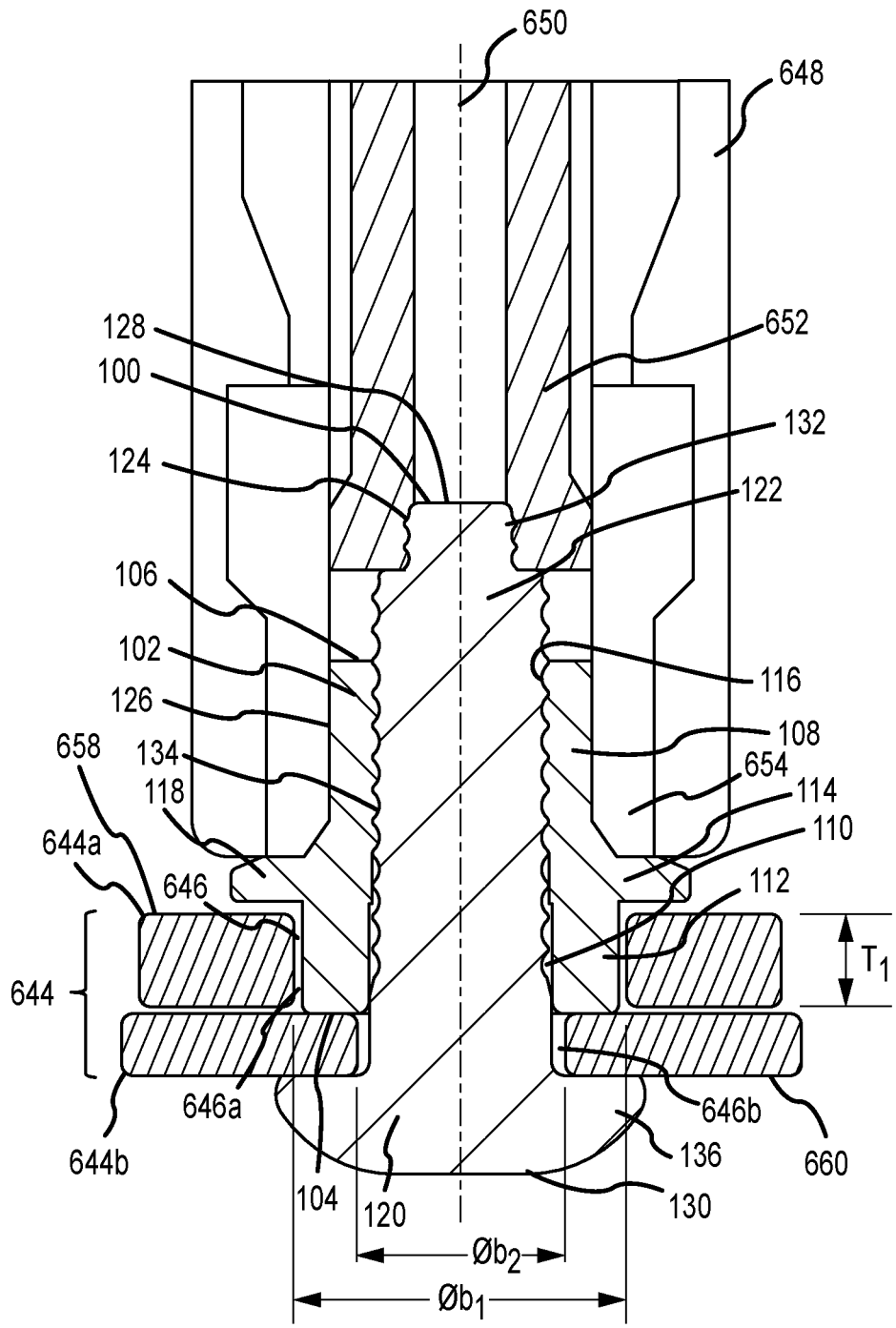
FIG. 6C is a cross-sectional side view of the multi-piece fastening system of FIG. 6B with the fastening collar at least partially deformed onto a shank of the multi-piece fastening system.
Figure 6D:
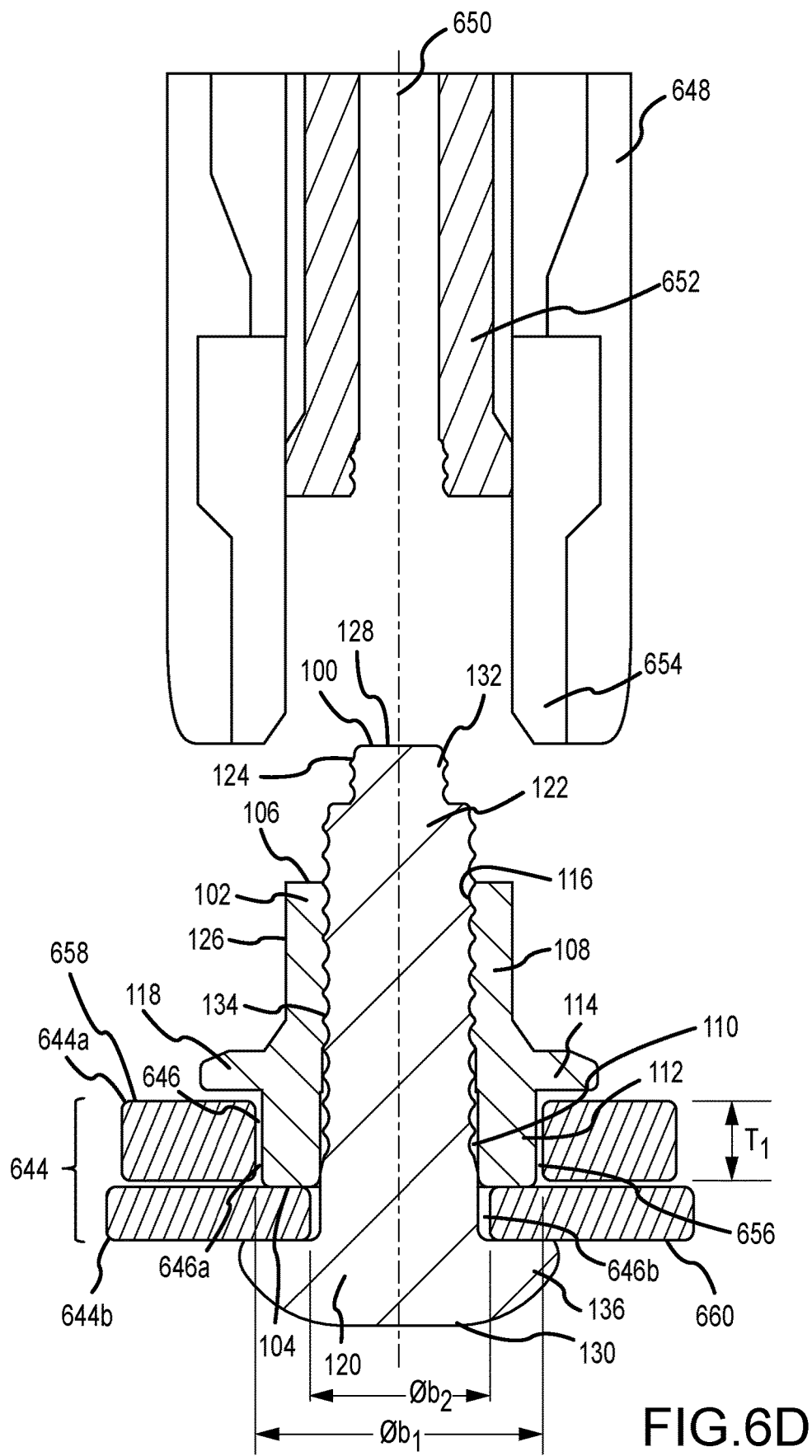
FIG. 6D is a cross-sectional side view of the multi-piece fastening system of FIG. 6C installed into the structure.

The first mandrel end 128 can comprise a pull region 124 configured to be engaged by an installation tool (e.g., installation tool 648, as illustrated in FIGS. 6B-6D and discussed below). The pull region 124 can comprise an axial length and in various embodiments may not comprise a taper. In other embodiments, the pull region 124 can comprise a taper or a reverse taper. For example, as one moves along the pull region 124 away from the shank 122 along a longitudinal axis of the mandrel 120, the diameter of the pull region 124 can decrease. In certain other embodiments, the pull region 124 can comprise a reverse taper where, as one moves along the pull region 124 away from the shank 122 along the longitudinal axis of the mandrel 120, the diameter of the pull region 124 increases. In various embodiments, the pull region 124 can be generally conical.

The pull region 124 can comprise at least one of a generally smooth region, an annular shoulder, a groove, and a bore and/or can comprise another feature configured to be engaged by an installation tool. For example, the pull region 124 can comprise grooves 132, as illustrated in FIGS. 1A-1B and 3, that can be engaged by an installation tool.

The shank 122 can define the longitudinal axis of the mandrel 120 and/or the multi-piece fastening system 100. The shank 122 can be configured to engage the fastening collar 102 in order to secure the shank 122 to the fastening collar 102. Upon engagement, the longitudinal axis of the mandrel 120 and the longitudinal axis of the fastening collar 102 can be substantially aligned and form the longitudinal axis of the multi-piece fastening system 100.

The shank 122 can comprise at least one of a generally smooth region, a threaded region, an annular shoulder, and a groove that engage the surface 116 of the fastening collar 102. The threaded region, annular shoulder, and/or the groove can be external relative to the shank 122. In various embodiments, all or a portion of the shank 122 includes grooves. For example, as shown in FIGS. 1B and 3, the shank 122 of the mandrel 120 includes grooves 134. In other embodiments, all or a portion of the shank 122 lacks grooves. In various embodiments, all or a portion of the shank 122 includes an annular shoulder. In other embodiments, the shank 122 lacks an annular shoulder. In various embodiments, all or a portion of the shank 122 includes a threaded portion. In other embodiments, the shank 122 lacks a threaded portion.

Referring again to FIGS. 1A-1B and 2, the cavity 110 of the fastening collar 102 can comprise a fourth diameter, Ø4, and can be configured to at least partially receive the shank 122 of the mandrel 120 therein. For example, the cavity 110 can comprise a shape suitable to receive the shank 122 of the mandrel 120, such as, for example, a generally cylindrical shape. During and/or after introduction of the shank 122 into the cavity 110, the elongate portion 108, including at least a portion of surface 116, can be at least partially deformed (e.g., swaged) onto the shank 122 responsive to forcible contact between the second region 114 and an installation tool, as described below. The deformation of the elongate portion 108 can secure the fastening collar 102 to the shank 122.

Figure 4:
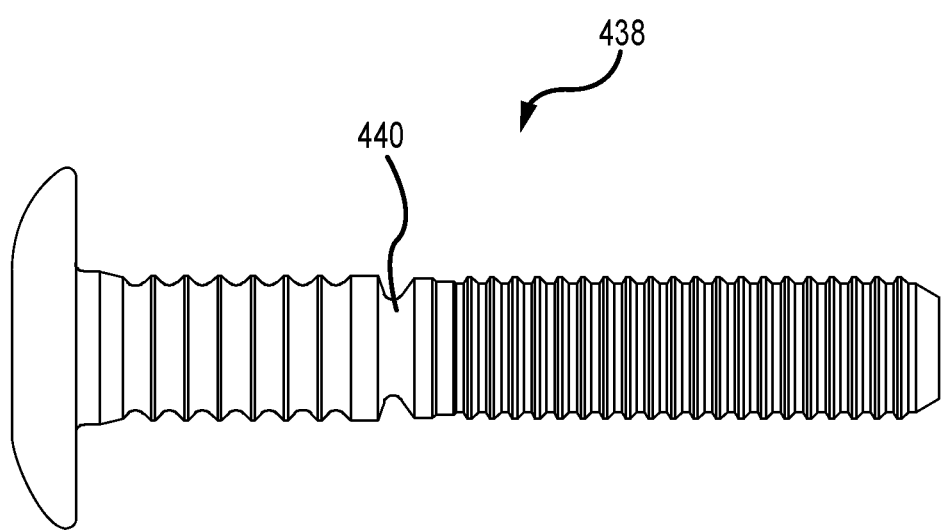
FIG. 4 is a side view of a non-limiting embodiment of a mandrel of a multi-piece fastening system according to the present disclosure.
Figure 5:
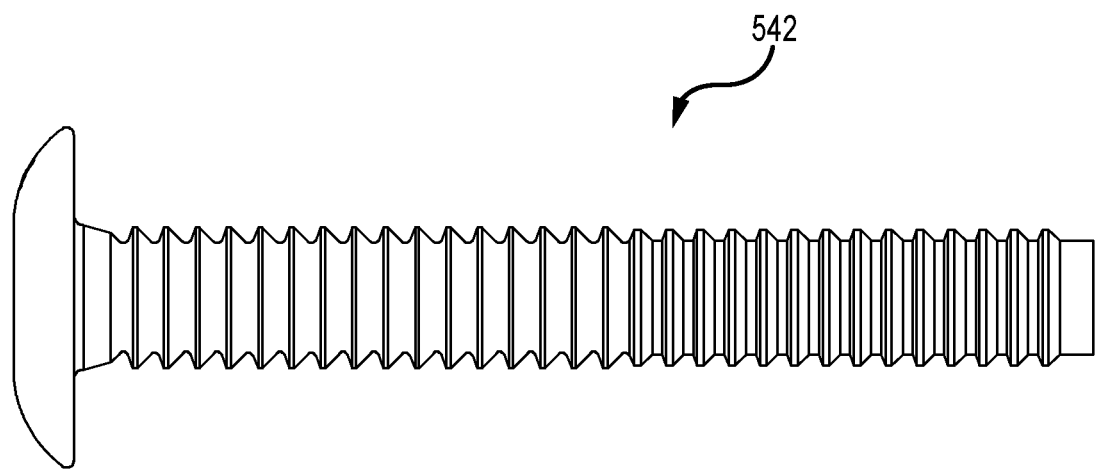
FIG. 5 is a side view of a non-limiting embodiment of a mandrel of a multi-piece fastening system according to the present disclosure.

Referring again to FIGS. 1A-1B and 3, in various non-limiting embodiments the mandrel 120 may not comprise a breakneck groove or other feature configured to fracture upon installation of the multi-piece fastening system 100, and the pull region 124 may stay intact after installation. In various other embodiments, referring to FIG. 4, a mandrel 438 of a multi-piece fastening system may comprise a breakneck groove 440 or other feature configured to fracture upon installation of the multi-piece fastening system. In certain other embodiments, referring to FIG. 5, a mandrel 542 of a multi-piece fastening system may not comprise a breakneck groove and may still be configured to fracture upon installation of the multi-piece fastening system. Thus, according to various embodiments, the multi-piece fastening systems according to the present disclosure may be installed into a structure without fracturing of a breakneck groove or other feature, or the breakneck groove or other feature may facture upon installation into the structure.

The multi-piece fastening system according to the present disclosure can comprise at least one of a metal, a metal alloy, a composite material, or another suitable material. For example, in various embodiments, the multi-piece fastening system 100 can comprise at least one of aluminum, an aluminum alloy, titanium, a titanium alloy, nickel, a nickel alloy, iron, an iron alloy, and a carbon fiber composite material.

As illustrated in FIGS. 6A-6D, the multi-piece fastening system 100 can be installed into a bore 646 of a structure 644. As illustrated, the bore 646 can extend through the structure 644 from a first side 658 to a second side 660. In various other embodiments, the bore 646 may extend from the first side 658 but not through the entire structure 644, such that a blind hole is formed and a multi-piece fastening system configured as a blind fastener may be used. In various embodiments, the bore 646 may not comprise threads.

The structure 644 can comprise, for example, at least one of a metal, a metal alloy, a composite material, or another suitable material. For example, in certain embodiments, the structure 644 can comprise at least one of aluminum, an aluminum alloy, titanium, a titanium alloy, nickel, a nickel alloy, iron, an iron alloy, and a carbon fiber composite material. In various embodiments, the structure 644 into which the multi-piece fastening system 100 is assembled comprises aluminum and/or an aluminum alloy, such as, for example, 7075 aluminum alloy. With reference to the accompanying figures, in various embodiments the structure 644 can be configured as at least one of an aerospace component or structure, an automotive component or structure, a transportation component or structure, a building and construction component or structure, or another component or structure.

The structure 644 can comprise a single layer of material or at least two layers of material. For example, as illustrated in FIGS. 6A-6D, the structure 644 can comprise a first layer 644a and a second layer 644b. The first layer 644a can be intermediate the second layer 644b and the fastening collar 102 when the fastening collar is installed. In various embodiments, the first layer 644a is adjacent to the fastening collar 102.

The bore 646 can comprise a first section 646a in the first layer 644a of the structure 644, and a second section 646b of the bore 646 in the second layer 644b of the structure 644. The first section 646a and the second section 646b can align to form the bore 646. The first section 646a can have a first bore diameter, $Ø_{b1}$, and the second section 646b can have a second bore diameter, $Ø_{b2}$. The first bore diameter, $Ø_{b1}$, and the second bore diameter, $Ø_{b2}$, can be the same or different. As illustrated in FIGS. 6A-6D, the first bore diameter, $Ø_{b1}$, is greater than the second bore diameter, $Ø_{b2}$ in the depicted non-limiting embodiment.

To enable rotation of the first layer 644a of the structure 644 about the longitudinal axis 650 of the multi-piece fastening system 100 after installation, the first diameter, $Ø_1$, of the first region 112 of the fastening collar 102 can be sized and configured to be less than the first bore diameter, $Ø_{b1}$. To inhibit rotation of the second layer 644b of the structure 644 about the longitudinal axis 650 of the multi-piece fastening system 100 after installation, the first diameter, Oi, of the first region 112 of the fastening collar 102 can be sized and configured to be equal to or greater than the second bore diameter, $Ø_{b2}$. In various embodiments, the first diameter, $Ø_1$, of the first region 112 of the fastening collar 102 can be less than the second bore diameter, $Ø_{b2}$, such that the fastening collar 102 can engage the head portion 136 of the mandrel 120.

Additionally, to facilitate alignment of the multi-piece fastening system 100 with the bore 646, the diameter, $Ø_m$, of the first mandrel end 128 can be sized and configured to be less than both the first bore diameter, $Ø_{b1}$, and the second bore diameter, $Ø_{b2}$, thereby allowing the first mandrel end 128 to readily move into and through the bore 646. In various embodiments, a diameter of the head portion 136 can be greater than the second bore diameter, $Ø_{b2}$, of the bore 646 in order to inhibit the mandrel 120 from further traversal into the bore 646. In various embodiments lacking a head portion 136, a diameter of the second mandrel end 130 can be sized and configured to be less than both the first bore diameter, $Ø_{b1}$, and the second bore diameter, $Ø_{b2}$, thereby allowing the second mandrel end 130 to readily move into and through the bore 646.

The first distance, $d_1$, of the first region 112 of the fastening collar 102 can be sized and configured to be greater than the thickness, $t_1$, of the first layer 644a of the structure 644 such that a clamping force is not applied to the first layer 644a upon installation. For example, in various non-limiting embodiments, the first distance, $d_1$, of the first region 112 can be at least 1% greater than the thickness, $t_1$, of the first layer 644a, such as, for example, at least 2% greater, at least 5% greater, or at least 10% greater. In various non-limiting embodiments, the first distance, $d_1$, of the first region 112 can be greater than the thickness, $t_1$, of the first layer 644a by less than 15%, such as, for example, less than 10%, less than 5%, or less than 2%. In various non-limiting embodiments, the first distance, $d_1$, of the first region 112 can be greater than the thickness, $t_1$, of the first layer 644a in a range of 1% to 15% greater, such as, for example, 1% to 10% greater, 1% to 5% greater, or 2% to 10% greater.

As illustrated in FIG. 6A, the first mandrel end 128 of the mandrel 120 was positioned in alignment with the second side 660 of the bore 646 before being inserted through the bore 646. In various other embodiments in which the multi-piece fastening system 100 is configured as a blind fastener without a head portion 136, the second mandrel end 130 of the mandrel 120 can be positioned in alignment with the first side 658 of the bore 646 and inserted through the bore 646.

Again referring to FIG. 6A, the fastening collar 102 has been positioned over the first mandrel end 128, and the first mandrel end 128 has been inserted into and through the cavity 110 of the fastening collar 102. The first collar end 104 of the fastening collar 102 has been inserted into the bore 646 such that the first region 112 of the fastening collar 102 contacts the second layer 644b of the structure 644. In various embodiments in which the mandrel 120 and the fastening collar 102 comprise threads, inserting the first mandrel end 128 into the cavity 110 of the fastening collar 102 may require rotation of at least one of the fastening collar 102 and the mandrel 120.

The first region 112 of the fastening collar 102 can be in forcible contact with the structure 644 or the head portion 136 of the mandrel 120. The forcible contact between the fastening collar 102 and the structure 644 or the head portion 136 can limit further axial movement of the fastening collar 102 relative to the mandrel 120 along the longitudinal axis 650.

Referring to FIG. 6B, a collet 652 of the installation tool 648 has engaged the shank 122 of the mandrel 120 of the multi-piece fastening system 100. For example, the collet 652 can be configured retract within the installation tool 648, which causes the collet 652 to forcibly contact the anvil 654 of the installation tool 648. Thereafter, the collet 652 can close around and forcibly contact the pull region 124 of mandrel 120, thereby engaging the pull region 124. Upon engagement, the collet 652 can apply an axial force to the pull region 124 of the mandrel 120, which can decrease a gap, if present, between the first layer 644a and the second layer 644b of the structure 644 and create forcible contact between the fastening collar 102 and the structure 644 or head portion 136 of the mandrel 120.

The anvil 654 can at least partially deform the fastening collar 102 onto the shank 122 of the mandrel 120, thereby securing the fastening collar 102 to the shank 122. For example, referring to FIG. 6C, the collet 652 can retract within the installation tool 648 and move the mandrel 120 as the collet 652 retracts due to the contact between the pull region 124 and the collet 652. As the collet 652 retracts, the anvil 654 forcibly contacts the second region 114 of the fastening collar 102. After a predetermined force is achieved, the elongate portion 108 can be at least partially deformed responsive to the forcible contact between the anvil 654 and the second region 114. For example, the elongate portion 108 can be swaged onto a generally smooth region, a threaded region, an annular shoulder, and/or a groove on a section of the shank 122 intermediate the first layer 644a and the first mandrel end 128.

The deformation of the elongate portion 108 can secure the fastening collar 102 to the mandrel 120, and thereby secure the multi-piece fastening system 100 to at least a portion of the structure 644. In that way, for example, the first layer 644a and second layer 644b of the structure 644 are secured together (e.g., inhibited from axial movement along the longitudinal axis 650 of the multi-piece fastening system 100). As illustrated in FIG. 6D, after installation of the multi-piece fastening system 100 into the structure 644, the first region 114 of the fastening collar 102 and the head portion 136 of the mandrel 120 are applying a clamping force to the second layer 644b of the structure 644, thereby securing the two-piece fastening system 100 to the second layer 644b.

A clearance 656 may be intermediate the fastening collar 102 and the first layer 644a of the structure 644. The clearance 656 may enable the first layer 644a to rotate about the longitudinal axis 650. The second diameter, $Ø_2$, of the second region 114 of the fastening collar 102 can be sized and configured to be greater than the first bore diameter, $Ø_{b1}$, in order to inhibit the first layer 644a from axially traversing along the longitudinal axis 650 away from the second layer 644b. Thus, the first layer 644a and the second layer 644b of the structure are secured together.

In other embodiments, the first layer 644a and the second layer 644b may be able to rotate about the longitudinal axis 650 after installation (e.g., the first region 112 of the fastening collar 102 can contact the head portion 136 of the mandrel 120). In certain other embodiments, the first layer 644a and the second layer 644b may be inhibited from rotating about the longitudinal axis 650 after installation (e.g., a clamping force is applied to both the first layer 644a and the second layer 644b by the multi-piece fastening system 100).

Figure 7:
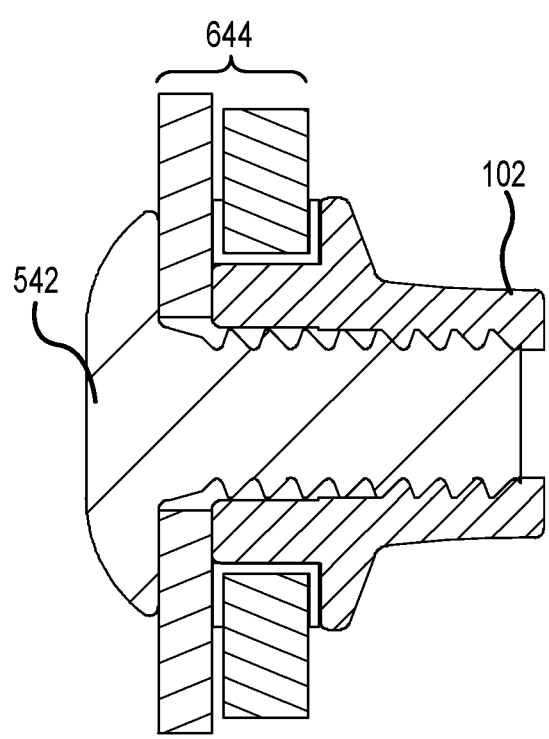
FIG. 7 is a cross-sectional side view of a multi-piece fastening system according to the present disclosure comprising the mandrel of FIG. 5 installed into a structure.
Figure 8:
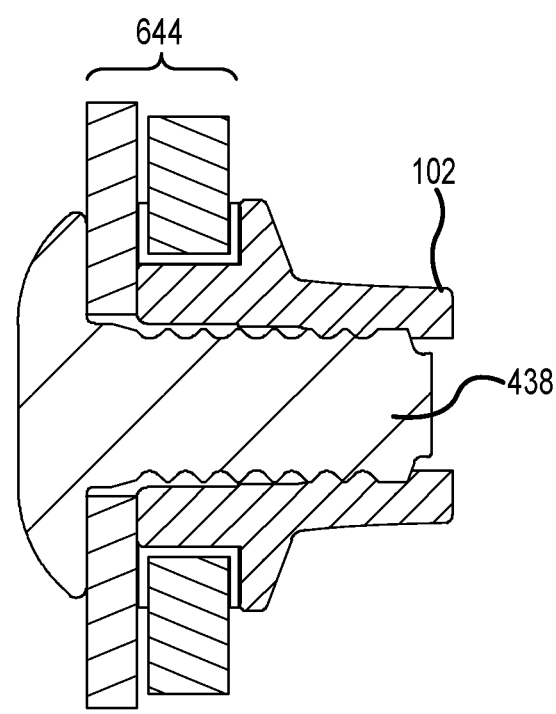
FIG. 8 is a cross-sectional side view of a multi-piece fastening system according to the present disclosure comprising the mandrel of FIG. 4 installed into a structure.

As illustrated in FIG. 6D, the mandrel 120 may not fracture after installation into the structure 644. Alternatively, as illustrated in FIG. 7, the mandrel 542 may fracture after installation into the structure 644. As illustrated in FIG. 8, the mandrel 438 may fracture along breakneck groove 440 after installation into the structure 644.

In various embodiments, the installation tool can be a puller tool, as illustrated in FIGS. 6B-6D, or a squeezer tool (not shown). For example, the squeezer tool can simultaneously apply a compressive force to the second region 114 of the fastening collar 102 and the second mandrel end 130 of the mandrel 120. The compressive force can deform the fastening collar 102 onto the shank 122 of the mandrel 120, thereby securing the fastening collar 102 onto the shank 122.

Figure 9:
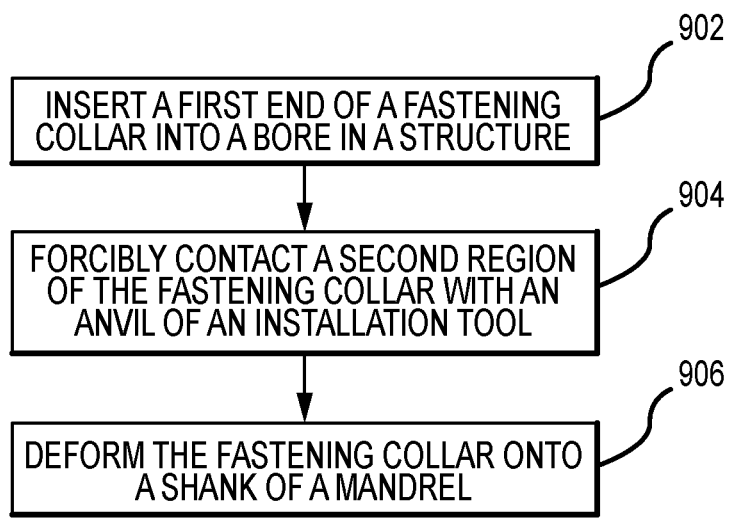
FIG. 9 is a flow chart of a non-limiting embodiment of a method for fastening according to the present disclosure.

In various embodiments, referring to FIG. 9, the multi-piece fastening systems described herein can be used in a method for fastening a structure. A first end of a fastening collar of a multi-piece fastening system according to the present disclosure can be inserted into a bore in a structure, 902. After inserting the first end of the fastening collar into the structure, the second region can be forcibly contacted with an anvil of an installation tool, 904. The fastening collar can be deformed onto a shank of a mandrel of the multi-piece fastening system, thereby securing at least a portion of the multi-piece fastening system in the structure, 906.

Various aspects of the invention include, but are not limited to, the aspects listed in the following numbered clauses.

1. A fastening collar for a multi-piece fastening system, the fastening collar comprising: a first end; a second end; and an elongate portion intermediate the first end and the second end and defining a longitudinal axis of the fastening collar, wherein the elongate portion comprises: a first region adjacent the first end, extending a first distance along the elongate portion, and comprising a first diameter, wherein the first region is configured to be received by a bore of a structure, a second region intermediate the first region and the second end, extending a second distance along the elongate portion, and comprising a second diameter greater than the first diameter, and a cavity extending through the elongate portion from the first end to the second end, wherein the cavity is configured to receive at least a portion of a shank of the multi-piece fastening system and the elongate portion is configured to at least partially deform onto the shank responsive to forcible contact between the second region and an installation tool.
2. The fastening collar of clause 1, wherein the second region comprises a flange adjacent the first region, the flange comprising a third diameter equal to or greater than the second diameter.
3. The fastening collar of any one of clauses 1-2, wherein the structure is configured as at least one of an aerospace part or component, an automotive part or component, a transportation part or component, and a building and construction part or component.
4. The fastening collar of any one of clauses 1-3, wherein the elongate portion is a continuous, single piece.
5. The fastening collar of any one of clauses 1-4, wherein a surface of the elongate portion adjacent to the cavity comprises at least one of a substantially cylindrical region, a threaded region, an annular shoulder, and a groove.
6. The fastening collar of any one of clauses 1-5, wherein the multi-piece fastener system is at least one of a lockbolt and a blind fastener.
7. A multi-piece fastening system comprising: a fastening collar comprising: a first end; a second end; and an elongate portion intermediate the first end and the second end and defining a longitudinal axis of the fastening collar, wherein the elongate portion comprises: a first region adjacent to the first end, extending a first distance along the elongate portion, and comprising a first diameter, wherein the first region is configured to be received by a bore of a structure, a second region intermediate the first region and the second end, extending a second distance along the elongate portion, and comprising a second diameter greater than the first diameter, and a cavity extending through the elongate portion from the first end to the second end, and a shank configured to be at least partially received by the cavity of the fastening collar, wherein the elongate portion is configured to at least partially deform onto the shank responsive to forcible contact between the second region and an installation tool.
8. The multi-piece fastening system of clause 7, wherein the second region comprises a flange adjacent to the first region comprising a third diameter equal to or greater than the second diameter.
9. The multi-piece fastening system of any one of clauses 7-8, wherein the structure is configured as at least one of an aerospace part or component, an automotive part or component, a transportation part or component, and a building and construction part or component.
10. The multi-piece fastening system of any one of clauses 7-9, wherein the elongate portion of the fastening collar is a continuous, single piece.
11. The multi-piece fastening system of any one of clauses 7-10, wherein a surface of the elongate portion adjacent to the cavity comprises at least one of a substantially cylindrical region, a threaded region, an annular shoulder, and a groove, and the shank comprises at least one of a substantially cylindrical region, a threaded region, an annular shoulder, and a groove.
12. The multi-piece fastening system of any one of clauses 7-11, wherein the system is at least one of a lockbolt and a blind fastener.
13. A method for fastening, the method comprising: inserting a first end of a fastening collar of a multi-piece fastening system into a bore in a structure, the multi-piece fastening system comprising: the fastening collar comprising: the first end; a second end; and an elongate portion intermediate the first end and the second end and defining a longitudinal axis of the fastening collar, wherein the elongate portion comprises: a first region adjacent to the first end, extending a first distance along the elongate portion, and comprising a first diameter, wherein the first region is configured to be received by a bore of a structure, a second region intermediate the first region and the second end, extending a second distance along the elongate portion, and comprising a second diameter greater than the first diameter, and a cavity extending through the elongate portion from the first end to the second end, and a shank configured to be at least partially received by the cavity of the collar, wherein the elongate portion is configured to at least partially deform onto the shank responsive to forcible contact between the second region and an installation tool, after the inserting, forcibly contacting the second region with an anvil of the installation tool; and deforming the fastening collar onto the shank, thereby securing at least a portion of the multi-piece fastening system in the structure.
14. The method of clause 13, wherein the structure comprises a first layer and a second layer, and wherein after the inserting, the second layer is positioned intermediate the first layer and the fastening collar.
15. The method of clause 14, wherein after the deforming, the first layer is secured to at least a portion of the system and the second layer can rotate about the longitudinal axis of the fastening collar.
16. The method of any one of clauses 14-15, wherein the first layer has a thickness less than the first distance.
17. The method of any one of clauses 14-16, wherein the first layer comprises a first opening having a first opening diameter and the second layer comprises a second opening having a second opening diameter greater than the first opening diameter, wherein the first opening and second opening are aligned to form the bore in the structure.
18. The method of any one of clauses 13-17, wherein the structure is configured as at least one of an aerospace part or component, an automotive part or component, a transportation part or component, and a building and construction part or component.
19. The method of any one of clauses 13-18, wherein the elongate portion of the fastening collar is a continuous, single piece.
20. The method of any one of clauses 13-19, wherein the multi-piece fastening system is at least one of a lockbolt and a blind fastener.

One skilled in the art will recognize that the herein described fasteners, structures, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, apparatus, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A two-piece assembly comprising:
   a fastening collar comprising:
     a first end;
     a second end; and
     an elongate portion intermediate the first end and the second end and defining a longitudinal axis of the fastening collar, wherein the elongate portion comprises:
       a first region adjacent the first end, extending a first distance along the elongate portion, and comprising a first diameter, wherein the first region is configured to be received by a bore of a structure,
       a second region intermediate the first region and the second end and extending a second distance along the elongate portion, wherein the second region comprises a flange and a section, the flange is adjacent the first region and comprises a second diameter greater than the first diameter, and the section comprises a third diameter less than the first diameter, and
       a cavity extending through the elongate portion from the first end to the second end; and
   a mandrel comprising:
     a shank configured to be at least partially received by the cavity of the fastening collar, wherein the elongate portion is configured to at least partially deform onto the shank to limit axial movement along the longitudinal axis responsive to forcible contact between the second region and an installation tool, and
     a head portion, wherein the head portion comprises a fourth diameter greater than the first diameter;
   wherein the two-piece assembly comprises a lockbolt.

2. The two-piece assembly of claim 1, wherein the structure is configured as at least one of an aerospace part or component, an automotive part or component, a transportation part or component, and a building and construction part or component.

3. The two-piece assembly of claim 1, wherein the elongate portion is a continuous, single piece.

4. The two-piece assembly of claim 1, wherein a surface of the elongate portion adjacent to the cavity comprises at least one of a cylindrical region, a threaded region, an annular shoulder, and a groove.

5. A multi-piece fastening system comprising:
   a fastening collar comprising:
     a first end;
     a second end; and
     an elongate portion intermediate the first end and the second end and defining a longitudinal axis of the fastening collar, wherein the elongate portion comprises:
       a first region adjacent to the first end, extending a first distance along the elongate portion, and comprising a first diameter, wherein the first region is configured to be received by a bore of a structure and wherein the first region is configured to contact the structure,
       a second region intermediate the first region and the second end and extending a second distance along the elongate portion, wherein the second region comprises a flange and a section, the flange is adjacent the first region and comprises a second diameter greater than the first diameter, and the section comprises a third diameter less than the first diameter, and
       a cavity extending through the elongate portion from the first end to the second end, and
   a mandrel comprising:
     a shank configured to be at least partially received by the cavity of the fastening collar, wherein the elongate portion is configured to at least partially deform onto the shank responsive to forcible contact between the second region and an installation tool, and
     a head portion, wherein the head portion comprises a fourth diameter greater than the first diameter;
   wherein the multi-piece fastening system comprises a lockbolt.

6. The multi-piece fastening system of claim 5, wherein the structure is configured as at least one of an aerospace part or component, an automotive part or component, a transportation part or component, and a building and construction part or component.

7. The multi-piece fastening system of claim 5, wherein the elongate portion of the fastening collar is a continuous, single piece.

8. The multi-piece fastening system of claim 5, wherein a surface of the elongate portion adjacent to the cavity comprises at least one of a cylindrical region, a threaded region, an annular shoulder, and a groove, and the shank comprises at least one of a cylindrical region, a threaded region, an annular shoulder, and a groove.

9. A method for fastening, the method comprising:
   inserting a first end of a fastening collar of a multi-piece fastening system into a bore in a structure, the multi-piece fastening system comprising:
     the fastening collar comprising:
       the first end;
       a second end; and
       an elongate portion intermediate the first end and the second end and defining a longitudinal axis of the fastening collar, wherein the elongate portion comprises:
         a first region adjacent to the first end, extending a first distance along the elongate portion, and comprising a first diameter, wherein the first region is configured to be received by a bore of a structure,
         a second region intermediate the first region and the second end extending a second distance along the elongate portion, wherein the second region comprises a flange and a section, the flange is adjacent the first region and comprises a second diameter greater than the first diameter, and the section comprises a third diameter less than the first diameter, and
    a cavity extending through the elongate portion from the first end to the second end; and
  a mandrel comprising:
    a shank configured to be at least partially received by the cavity of the collar, wherein the elongate portion is configured to at least partially deform onto the shank responsive to forcible contact between the second region and an installation tool, and
    a head portion, wherein the head portion comprises a fourth diameter greater than the first diameter;
after the inserting, forcibly contacting the second region with an anvil of the installation tool; and
deforming the fastening collar onto the shank, thereby securing at least a portion of the multi-piece fastening system in the structure,
wherein the multi-piece fastening system comprises at least one of a lockbolt and a blind fastener.

10. The method of claim 9, wherein the structure comprises a first layer and a second layer, and wherein after the inserting, the second layer is positioned intermediate the first layer and the fastening collar.

11. The method of claim 10, wherein after the deforming, the first layer is secured to at least a portion of the system and the second layer can rotate about the longitudinal axis of the fastening collar.

12. The method of claim 10, wherein the first layer has a thickness less than the first distance.

13. The method of claim 10, wherein the first layer comprises a first opening having a first opening diameter and the second layer comprises a second opening having a second opening diameter greater than the first opening diameter, wherein the first opening and second opening are aligned to form the bore in the structure.

14. The method of claim 9, wherein the structure is configured as at least one of an aerospace part or component, an automotive part or component, a transportation part or component, and a building and construction part or component.

15. The method of claim 9, wherein the elongate portion of the fastening collar is a continuous, single piece.

16. The method of claim 9, wherein the multi-piece fastening system comprises a blind fastener.

\* \* \* \* \*